July 13, 1943.   H. W. ANWAY   2,324,127
TESTING APPARATUS FOR FRIABILITY OF FRIABLE MATERIAL
Filed June 9, 1941   2 Sheets-Sheet 1
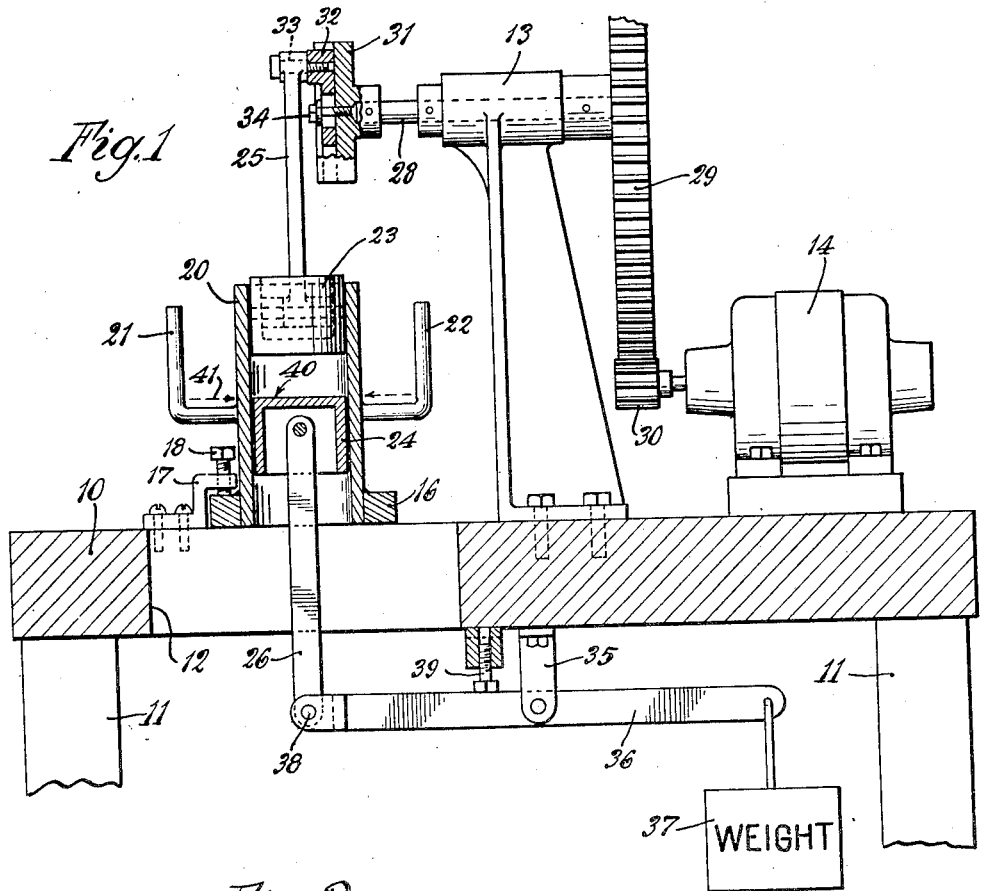
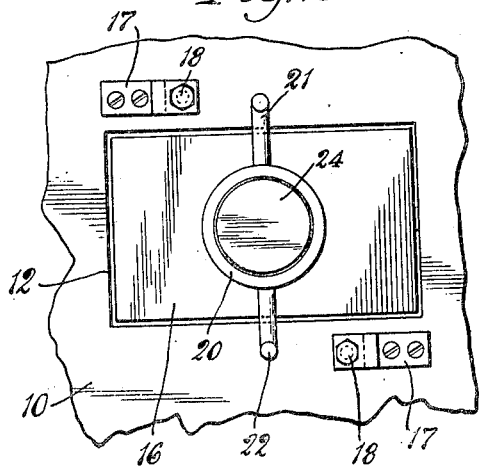
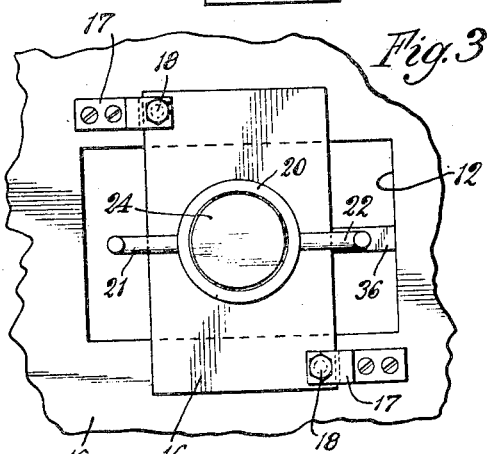
Inventor
Herman Wilbur Anway
by W. Bartlett Jones
Attorney.

July 13, 1943.  H. W. ANWAY  2,324,127
TESTING APPARATUS FOR FRIABILITY OF FRIABLE MATERIAL
Filed June 9, 1941  2 Sheets-Sheet 2
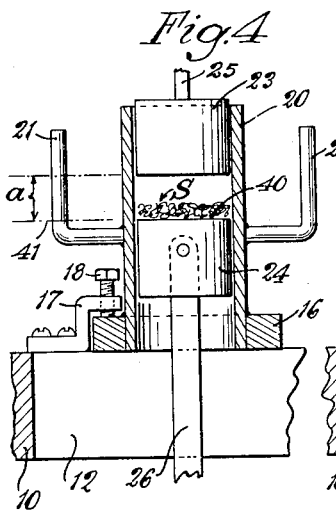
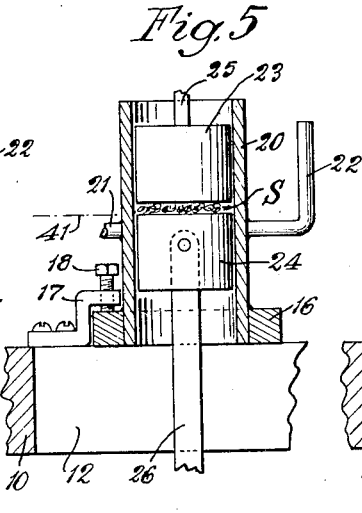
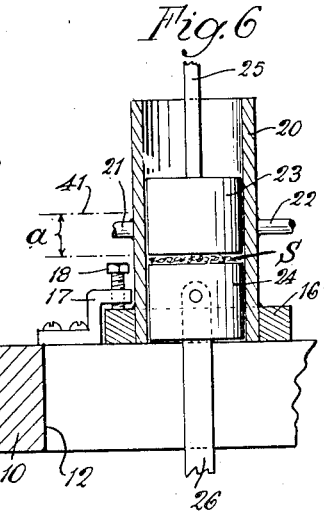
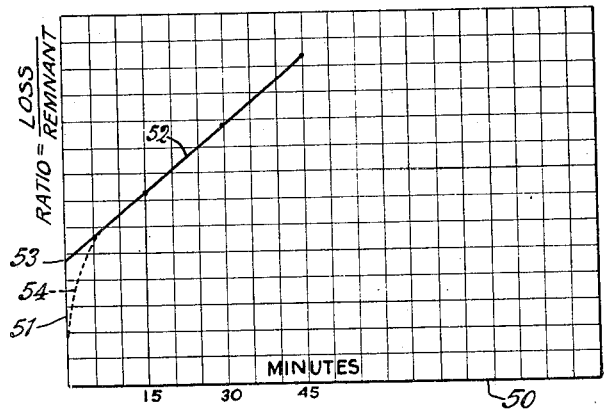
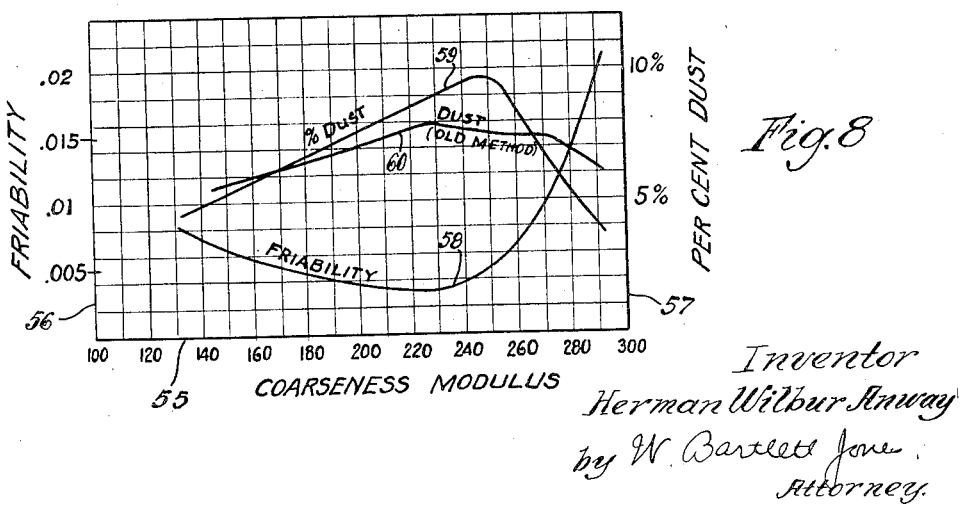
Inventor
Herman Wilbur Anway
by W. Bartlett Jones
Attorney.

Patented July 13, 1943

2,324,127

UNITED STATES PATENT OFFICE 2,324,127

TESTING APPARATUS FOR FRIABILITY OF FRIABLE MATERIAL

Herman Wilbur Anway, Cloquet, Minn., assignor to Wood Conversion Company, Cloquet, Minn., a corporation of Delaware Application June 9, 1941, Serial No. 397,189

7 Claims. (Cl. 73—51)

The present invention relates generally to apparatus useful in physical tests, and particularly to the determination of the physical property "friability," and its related resultant property "the tendency to dustiness." In particular it relates to the testing of fiber such as wood fiber, to determine these characteristics as measured for comparison.

The test as applied to fiber not only gives the tendency of the material to form what is called "dust" (for the lack of a better term), but it also may give a determination of the amount of such dust already in the sample chosen for the test.

A stock of fibers consists of an assortment of fibers (which term includes fiber bundles) ranging from fine to coarse, and definable by a "coarseness modulus." Non-fibrous material may also be present. The proportion of these various sizes may be determined by fractionation tests. Some of the material is so constituted that it readily escapes from the rest. For example, some non-fibrous particles and some fine fibrous material may easily escape from the rest in handling, packing, etc. Its escape is in part dependent upon its ability to float away in the air, in part upon its individual character and in part upon its character relative to the rest of the stock as a matrix to hold it or let it escape. That portion which may so escape is herein referred to as "dust." The present invention determines it, as present, or formed, by a procedure which effects its separation from the matrix.

From the foregoing explanation, it will be seen that "dust" is not a positive material which can be defined apart from the matrix in which it occurs. That which may be derived as "dust" from one matrix may not be "dust" to another matrix.

The friability of any material is an indication of its durability. The more durable, the less friable. The more friable, the less durable. The durability is important in the use of fiber for insulating for heat or sound. Fiber is produced, handled, shipped, worked, and the like to get it in place finally as insulation. Even then it may be subject to shock, as when used in vehicles, or when used in a refrigerator of which the door is slammed many times a day. It is therefore of great importance to have a reliable test and test means to study fibrous materials as to the property of dust, dustiness, and tendency to dust, friability and durability as to shock or mechanical treatment.

It is therefore an object of the present invention to provide a device which may be used to determine the friability of a material by subjecting it to controlled mechanical shock.

A particular object of the invention is the provision of a testing device.

Various other and ancillary objects and advantages of the invention will be understood from the following description and explanation of the invention as set forth in the accompanying drawings, in which:

Fig. 1 is a view in vertical elevation, partly in cross-section, showing a table-top carrying parts forming the apparatus.

Fig. 2 is a fragmentary view of the table-top showing a rectangular hole therein through which has dropped a rectangular base of the test device.

Fig. 3 is a view as in Fig. 2 in which the said base is raised and lies across the opening, also as shown in Fig. 1, in testing position.

Figs. 4, 5 and 6 represent successive positions of the test cylinder and opposing pistons therein.

Fig. 7 is a plot of test measurements on one sample of fiber.

Fig. 8 is a plot of determined ultimate results on a series of fibers.

In principle, the test as applied to fiber contemplates that the sample be placed upon a movable platform which yields against a fixed force, moving from a zero position. The sample on the platform is struck with a controlled force at a given point in a controlled stroke, so that the platform is forced to yield during the completion of the stroke.

This may be effectively carried out by having a vertical cylinder in which two pistons oppose each other. The bottom one provides a platform, and is raised to a "platform" position by a force, such as a counterbalancing weight against which the platform is lowered. The striking piston has a stroke within which is the "platform" position, preferably in the middle. The sample is placed on the platform, and the upper piston reciprocated at a timed rate.

Such a device is represented in Fig. 1. A table-top 10, with legs 11 has a rectangular opening 12 therein, a bracket 13 and motor 14 thereon. A base block 16 of rectangular form has a size permitting it to drop through hole 12 as in Fig. 2, with a long dimension permitting it to rest on the table-top across the opening 12, as shown in Figs. 1 and 3. So set, two diagonal corners rest under angular brackets 17 carried by the table, with setscrews 18 therein. A cylinder 20 with vertical bore of 10 inches length by 3 inches diameter (merely for example), is mounted on the base 16.

Two angular handles 21 and 22 project from the sides of the cylinder as shown in Fig. 1. These hold the cylinder in lower position as in Fig. 2. Thus, the cylinder is capable of being readily lowered for inserting and removing samples, and raised, to set the apparatus for operation.

In set position, the cylinder 20 has pistons 23 and 24 respectively entering at the top and bottom. These may be ordinary automobile engine pistons with pivoted rods 25 and 26 respectively. Bracket 13 bears a shaft 28 which has a large gear 29 meshing with pinion 30 on the shaft of motor 14, so as to give a fixed speed, such as 40 revolutions per minute. The shaft 28 also has a facing block 31 with a diametrical slot therein, in which is an adjustably fixed member 32 carrying a crank pin 33. The member 32 slides in the said slot for adjustment of its fixed position and is held by bolt 34 entering block 31. The crank pin 33 in turn bears and drives the rod 25 of the upper piston. Thus the stroke is adjustably fixed, as at 3 inches.

The lower side of the table has a bracket 35 on which a tilting arm 36 carries on equal arms a weight 37 such as 10 lbs., and the piston rod 26 pivoted thereto at 38. Thus, the weight 37 tends to raise the piston 24. An adjustable stop 39 acting on arm 36 brings the platform surface 40 of piston 24 to rest on line 41 (dotted) which is preferably the center line of the preferred 3-inch stroke of the other piston 23. A controlled functional clearance is provided for pistons and cylinder, such as 0.005 inch.

In Figs. 4, 5 and 6, the cylinder and pistons are shown in three important positions occupied in the test. In Fig. 4 a sample S such as 5 grams of fiber is shown on piston head 24 which is at rest on the platform level 41. Piston 23 is uppermost in its stroke at distance $a$ above the platform, at the half-stroke-level. In Fig. 5 the upper piston is shown just striking the sample S. In Fig. 6 the piston 23 has pushed on the sample to force piston 24 down against weight 37. Then the piston 23 is moved up until position of Fig. 4 is resumed.

The above cycle is repeated at the fixed frequency for a given interval of time. Upon inserting the sample, where it is fiber, it is distributed in free-fiber form over the platform. The clearance permits pumping air in and out, and this blows out "dust," through the clearance space. Thus, all the initial dust is first blown out, and then the additional dust which is formed in accordance with the "friability." After the time interval, the material left on the platform is weighed. This is a mat where fiber is used. Then the mat is replaced, and the test repeated for one or more measured intervals. Thus the actual data consists of original weight, one or more recorded time periods, and one or more weights of sample remnants corresponding to each time period.

MATHEMATICAL CONSIDERATIONS

Obviously, as time increases, the loss of fiber as dust will increase, and the weight of fiber remaining will decrease.

Let
S=weight of sample
$t$ =time
$d$=loss as dust at time $t$
$w$=weight remaining on platform As time $t$ increases, then $d$ increases and $w$ decreases. When the test results are plotted on coordinate paper, with $t$ as abscissa, and the ratio of $d$ to $w$ as ordinate, a straight line is obtained.

$$\text{Let } y=\frac{d}{w}$$

The formula of the straight line is represented by the expression $$y=mt+b$$

where $m$ is the slope of the line and $b$ is a constant which may be found on the plot. These values are significant. The value $m$ represents "friability" and the value $b$ determines the amount of dust in the sample before the test. Mathematically, $$b=\frac{\text{amount of dust present}}{\text{actual amount of fiber}}$$

Fig. 7, for example, the values $y$ and $t$ were determined with apparatus as described with the preferred dimensions, settings and operations above described, and found as in Table I as follows:

Table I

| $y$ | $t$ |
|---|---|
| .147 | 15 |
| .198 | 30 |
| .245 | 45 |

These are plotted in Fig. 7 with $t$ on the axis 50 and $y$ on the axis 51, giving the straight line 52, crossing axis 51 at 53. This indicates that at time of zero there is a ratio of dust to non-dust, and hence this must indicate the original dust of the sample before any is produced in the test. If this were removed before the test, the sample would produce just as much dust as in the case where it is not removed. The slope of the line is characteristic of the material for the set conditions, and its position vertically on the chart is due to initial dust. Hence, the slope represents friability.

Specifically, in Fig. 7 the point 53 is at ratio .097. This corresponds to 8.9% dust in the original sample.

Reference is made to the dotted line portion 54 in Fig. 7. Many experiments have shown that if observations are made at early times in the test, the actual curve determined is much like the line 54, becoming linear fairly early in the test. This merely indicates that the initial dust is not removed immediately that the test begins, but is removed over a short period of time covered by line 54.

COMPARISONS OF A SERIES OF FIBER STOCKS

The value of the invention is made apparent from the following description of its application to a series of fiber stocks made in the same general way, but with modifications to produce variations in particle size distribution. Thus, the series runs from generally finer to generally coarser stock. Since each stock has fibers varying from fine to coarse, the average distribution is expressed in a well-known manner as "coarseness modulus," the modulus figure increasing as the general coarseness increases. These are expressed also as "Run No.," referring to the preparation of the stock tested. This identification is used so that the tests may be compared with other properties of the same samples found in other copending applications. Table II gives the data determined by the present invention with reference to a series of eight stocks. Also, for comparison, a dust content determined by an "old method" is given. In the said old method a physical separation is attempted, such as by blowing, screening, shaking or the like in a standard way, so as to limit creation of more dust.

In the old method larger test samples are used than in the method of this invention. The results by both methods check reasonably well, and this justifies each method. Other methods not here described also check and justify the present method for determining initial dust.

*Table II*

| Run No. | Coarseness modulus | Percent of original dust | | Friability value $m$ |
|---|---|---|---|---|
| | | "Old" | Value $y$ | |
| 1 | 131.6 | | 4.9 | .0079 |
| 2 | 146.2 | 5.5 | 5.0 | .0070 |
| 3 | 160.2 | 6.9 | 6.8 | .0057 |
| 4 | 196.8 | 6.2 | 7.0 | .0042 |
| 5 | 228.6 | 7.9 | 8.9 | .0032 |
| 6 | 249.8 | 7.6 | 10.2 | .0062 |
| 7 | 273.2 | 7.5 | 6.2 | .0078 |
| 8 | 292.6 | 6.1 | 3.8 | .0226 |

Fig. 8 shows the above data in plotted form. The coarseness modulus is plotted on the horizontal axis 55, and the friability (value $m$) on the vertical axis 56, while the "percent dust" is plotted on the vertical axis 57. Line 58 represents friability. Line 59 represents initial dust determined with friability. Line 60 represents "dust" determined by the old method.

Fig. 8 shows that in the series of fiber stocks available, there is an optimum mixture of sizes represented by a coarseness modulus in the vicinity of 230. It also shows that the less friable stock has the more free dust. This is significant of the actions in the machine making said series.

The pulps were made of jack pine wood in a grinder operating on the wood in the presence of high pressure steam, in a machine of the Asplund Patent No. 2,145,851 under the Asplund process Patent No. 2,008,892. The discharged fiber is dried directly. The only change in operation to secure the series of pulps was the setting of the grinding disk to vary the space between. The results of the friability analysis indicate that there may be more and less friable portion; that the machine makes "dust" from the more friable portions, leaving the less friable portions. More of the wood is obtained as fiber at high and a low coarseness modulus. More waste as dust attends the less friable stock.

In making the test on fiber like that described above, it is immaterial that the moisture content is up to 15% or thereabouts. Oven dry fiber (about 100° C. for 1 to 1½ hours) gives substantially the same values as fiber in equilibrium with the atmosphere. The first moisture taken up by fiber is so held that it does not enter the fiber as a constituent thereof, being, it is believed, largely on the surface. At least insofar as the present invention is concerned, the effect of moisture is as if such were so.

Another use for determination of friability is to detect changes in material, with age, oxidation, heating and the like. For example, the property of "permanence to heat" is determinable within limits of the definition that such property is the ratio of the friability of the material before subjected to altering conditions to the friability of the supposedly altered material. For comparative tests a standard condition is selected. Thus, for fiber, one standard chosen is to heat the fiber in an oven for 24 hours at 150° C. The ratio of friabilities of stock (in moisture equilibrium with the atmosphere) before and after heating is an index of heat permanence for the purpose of comparison.

To illustrate the use of the friability value to determine a changeable property, the following example is given to determine permanence to heat. A stock of fiber is chosen for taking two samples for friability determinations. Sample A is kept at equilibrium with the atmosphere. Sample B is heated for 24 hours at 300° F., and is then allowed to come to moisture equilibrium with the atmosphere. Both samples A and B are then tested for friability. Sample A tests with friability of .0013, and sample B tests with friability of .026. The ratio of friability of A to the friability of B is a reliable index of heat permanence for the purpose of comparison, and for the above specific test the heat permanence is .05.

The apparatus provides a controlled impact for material confined in a space, variable by a plunger providing the impact, and it provides for shrinkage of the space at the end of the stroke of the plunger, which shrinkage may result from the change of the material confined therein. The apparatus may be used for testing the effect of repeated impact on wood, wallboard, flooring, and other solid bodies. It may be used to test the packing tendencies of granular or powdered materials, the space between the piston and the cylinder being varied according to the material being tested, and the nature of the test. It may also be used to test metals for malleability, rubber and plastics for fatigue, minerals for crushability, concrete for traffic resistance, particularly edge-failure.

The present application is a continuation-in-part of my copending application Serial No. 290,999, filed August 19, 1939.

Numerous adaptations of the present invention will be apparent to those skilled in the art, and are contemplated as falling within the scope of the appended claims.

I claim:

1. Apparatus comprising a vertical cylinder, two pistons movable in said cylinder with horizontal flat areas opposing each other, the bottom piston being movable downwardly from a maximum high position against a standardizable force by impact of the other upon a test specimen resting on the bottom piston, the upper piston being reciprocable over a standardizable range including the said maximum high position at a standardizable location within the limits of said range, and means to reciprocate said upper piston at a standardizable rate.

2. Apparatus comprising a vertical cylinder, two pistons movable in said cylinder with horizontal flat areas opposing each other, the bottom piston being movable downwardly from a maximum high position against a standardizable force by impact of the other upon a test specimen resting on the bottom piston, the upper piston being reciprocable over a standardizable range including the said maximum high position at a standardizable location within the limits of said range, a connecting rod attached to said upper piston at one end, a crank shaft attached to said rod at the other end, and a constant speed rotary driving element carrying said crank shaft.

3. Apparatus comprising a vertical cylinder, two pistons movable in said cylinder with horizontal flat areas opposing each other, the bottom piston being movable downwardly from a maximum high position against a standardizable force by impact of the other upon a test specimen resting on the bottom piston, the upper piston being reciprocable over a standardizable range including the said maximum high position at a standardizable location within the limits of said range, a connecting rod attached to said upper piston at one end, a crank shaft attached to said rod at the other end, means to adjust the eccentricity of said crank shaft, and a constant speed rotary driving element for actuating said crank shaft.

4. Apparatus comprising a table top having a hole therein, a cylinder open at both ends and adapted to be fixed to the table top to open over said hole, a pivoted arm under said table, a piston head to reciprocate in said cylinder from the bottom, a connecting rod between said cylinder and said pivoted arm, a weight on said pivoted arm tending to move said piston upwardly in said cylinder, means to limit the height of said piston head into said cylinder, said piston being movable downwardly from said limited height against said weight, a second piston head movable in said cylinder from the top in a range to move below said limited height of the first piston head, whereby a test specimen may be confined between the two piston heads, and means to reciprocate the upper piston at a standardizable rate and over a standardizable range.

5. In apparatus for testing, a cylinder, a yieldable platform in the cylinder to hold a specimen, means to control the yielding pressure of the platform, and a piston reciprocable in the cylinder to strike the specimen on the platform and to force the platform to yield, one or more of the cylinder, platform or piston parts providing an air vent from the space between the platform and the piston.

6. In apparatus for testing, a cylinder, a yieldable platform in the cylinder to hold a specimen, means to control the yielding pressure of the platform, and a piston reciprocable in the cylinder to strike the specimen on the platform and to force the platform to yield, there being a space for the escape of dust from the specimen effective by the pumping action of the reciprocable piston.

7. In apparatus for testing material for the presence or formation of a product thereof resulting from the reaction of said material when pounded, a horizontal flat vertically movable platform for holding a specimen to be tested, means exerting a constant force to urge said platform into an extreme upward position, means forming a peripheral vertical walled chamber about said platform, means forming an opposing horizontal flat area within said chamber as a striking surface for a specimen on said platform, and means to move said striking surface vertically relative to said platform within said chamber with standardizable repetitive blows to compress the specimen on said platform and thereby move said specimen and platform.

HERMAN WILBUR ANWAY.